United States Patent
Abbott

(10) Patent No.: US 10,702,790 B1
(45) Date of Patent: Jul. 7, 2020

(54) SODIUM CARBONATE PRODUCTION SYSTEM

(71) Applicant: Warren Abbott, Ranson, WV (US)

(72) Inventor: Warren Abbott, Ranson, WV (US)

(*) Notice: Subject to any disclaimer, the term of this patent is extended or adjusted under 35 U.S.C. 154(b) by 0 days.

(21) Appl. No.: 16/539,499

(22) Filed: Aug. 13, 2019

(51) Int. Cl.
| | | |
|---|---|---|
| *B01D 1/26* | (2006.01) | |
| *B01D 1/28* | (2006.01) | |
| *B01D 1/00* | (2006.01) | |
| *C01D 7/00* | (2006.01) | |

(52) U.S. Cl.
CPC .............. *B01D 1/26* (2013.01); *B01D 1/0058* (2013.01); *B01D 1/2856* (2013.01); *C01D 7/00* (2013.01)

(58) Field of Classification Search
CPC ...... B01D 1/0058; B01D 1/26; B01D 1/2856; C01D 7/00
See application file for complete search history.

(56) References Cited

U.S. PATENT DOCUMENTS

| | | |
|---|---|---|
| 3,990,245 A | 11/1976 | Heilemann |
| 5,370,772 A | 12/1994 | Arpalahti |
| D490,374 S | 5/2004 | Amakawa |
| 8,616,015 B2 | 12/2013 | Amedick |
| 2006/0236698 A1 | 10/2006 | Langson |
| 2016/0017800 A1* | 1/2016 | Simpson .................. C07C 1/12 429/422 |
| 2016/0363353 A1 | 12/2016 | Campbell |
| 2017/0355630 A1* | 12/2017 | Hardwick ............ B01D 1/0017 |

* cited by examiner

*Primary Examiner* — Brian A McCaig

(57) ABSTRACT

A sodium carbonate production system for recapturing thermal energy lost during sodium carbonate manufacturing includes a triple effect evaporator apparatus, a thermal energy waste recovery apparatus, and a barometric surface condenser. The thermal energy waste recovery apparatus comprises an ammonia heat exchanger in operational communication with the triple effect evaporator apparatus. An ammonia turbine is in operational communication with the ammonia heat exchanger. An electric generator is in operational communication with the ammonia turbine to produce electricity. An ammonia compressor is in operational communication with the ammonia turbine and the ammonia heat exchanger. The ammonia heat exchanger is in operational communication with the barometric surface condenser.

3 Claims, 2 Drawing Sheets

SODIUM CARBONATE PRODUCTION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to sodium carbonate manufacturing systems and methodologies and more particularly pertains to a new sodium carbonate manufacturing system and method for recapturing thermal energy lost during sodium carbonate manufacturing.

BRIEF SUMMARY OF THE INVENTION

An embodiment of the disclosure meets the needs presented above by generally comprising a triple effect evaporator apparatus, a thermal energy waste recovery apparatus, and a barometric surface condenser. The sodium carbonate production system generally comprises a first effect heat exchanger and a first effect condensate storage in operational communication with the first effect heat exchanger. A first effect evaporator is in operational communication with the first effect heat exchanger. A second effect heat exchanger is in operational communication with the first effect evaporator. A second effect condensate storage is in operational communication with the second effect heat exchanger. A second effect evaporator is in operational communication with the second effect heat exchanger. A third effect heat exchanger is in operational communication with the second effect evaporator. A third effect condensate storage is in operational communication with the third effect heat exchanger. A third effect evaporator is in operational communication with the third effect heat exchanger. The thermal energy waste recover apparatus is located between the third effect evaporator and the barometric surface condenser to harvest thermal energy before being released. In traditional sodium carbonate manufacturing the third effect evaporator is in direct operational communication with the barometric surface condenser.

The thermal energy waste recovery apparatus comprises an ammonia heat exchanger in operational communication with the third effect evaporator. An ammonia turbine is coupled to the ammonia heat exchanger and is in operational communication with the ammonia heat exchanger. An electric generator is coupled to the ammonia turbine and is in operational communication with the ammonia turbine to produce electricity configured to be stored and returned to the power grid. An ammonia compressor is coupled to the ammonia turbine and is in operational communication with the ammonia turbine and the ammonia heat exchanger. The barometric surface condenser is in operational communication with the ammonia heat exchanger.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
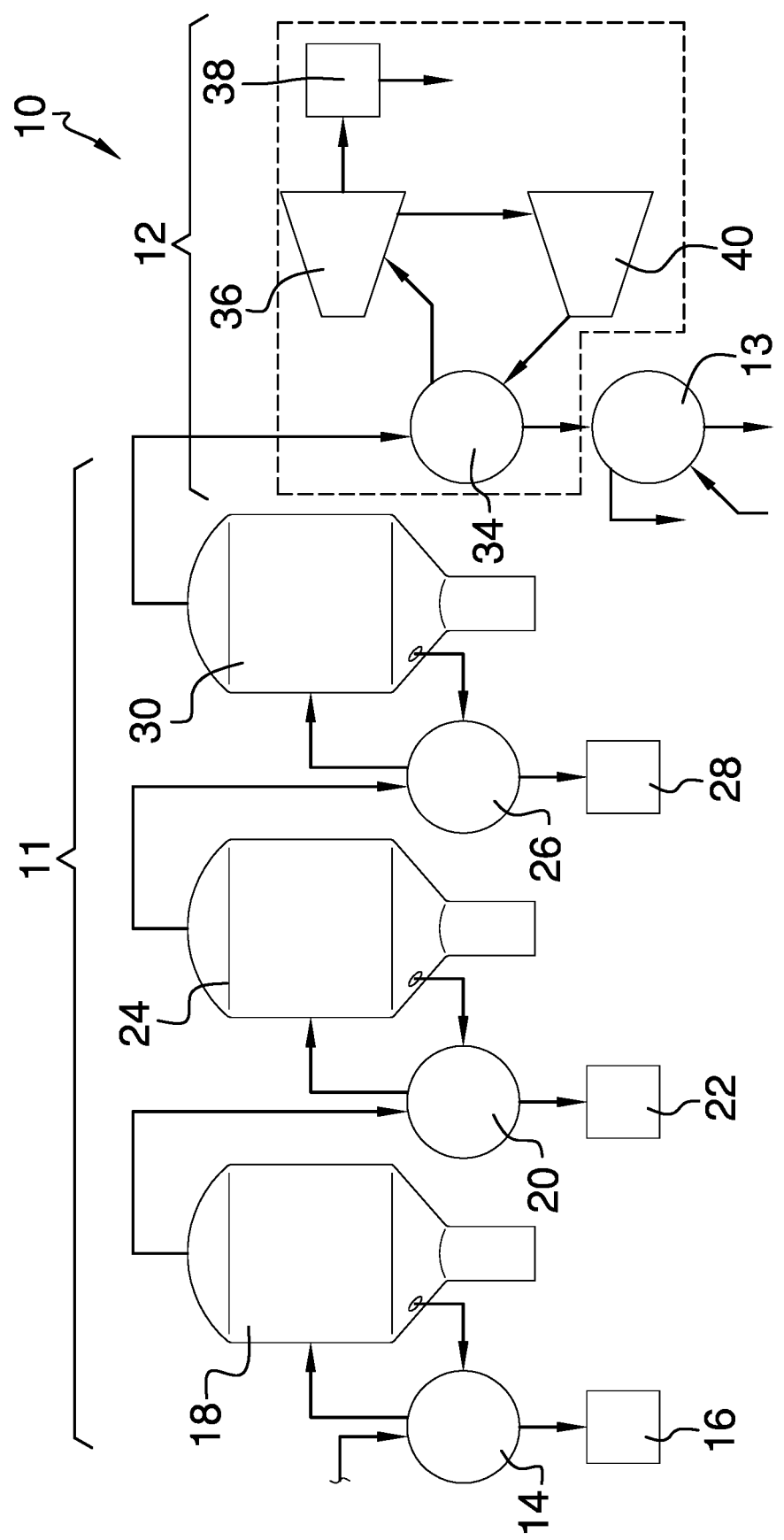
FIG. 1 is a block diagram view of a sodium carbonate production system according to an embodiment of the disclosure.
Figure 2:
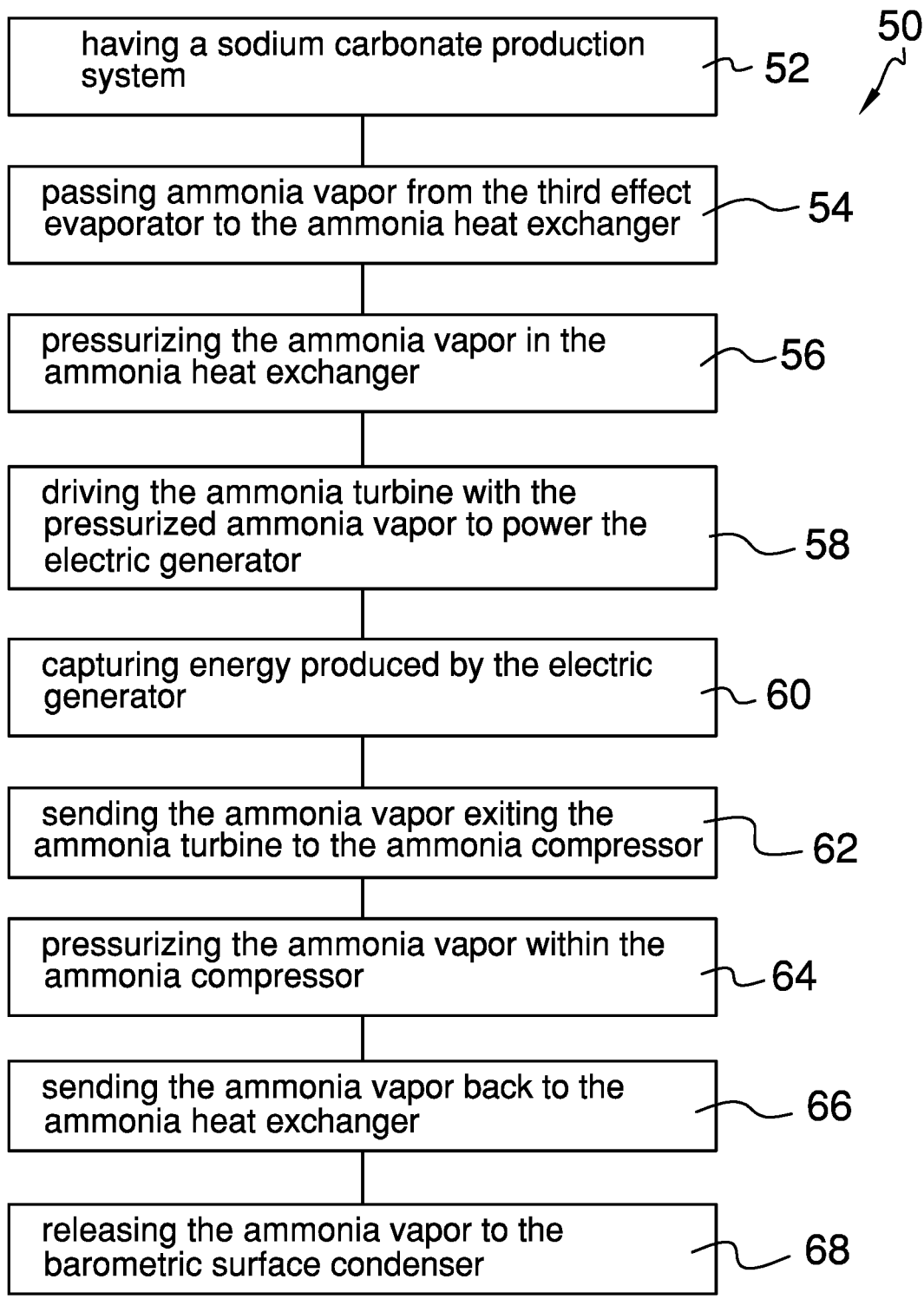
FIG. 2 is a block diagram view of method utilizing an embodiment of the disclosure.

With reference now to the drawings, and in particular to FIGS. 1 through 2 thereof, a new sodium carbonate manufacturing system and methodology embodying the principles and concepts of an embodiment of the disclosure and generally designated by the reference numeral 10 will be described.

As best illustrated in FIGS. 1 through 2, a sodium carbonate production system 10 comprises a triple effect evaporator apparatus 11, a thermal energy waste recovery apparatus 12, and a barometric surface condenser 13. The sodium carbonate production system 10 generally comprises a first effect heat exchanger 14 and a first effect condensate storage 16 in operational communication with the first effect heat exchanger 14. A first effect evaporator 18 is in operational communication with the first effect heat exchanger 14. A second effect heat exchanger 20 is in operational communication with the first effect evaporator 18. A second effect condensate storage 22 is in operational communication with the second effect heat exchanger 20. A second effect evaporator 24 is in operational communication with the second effect heat exchanger 20. A third effect heat exchanger 26 is in operational communication with the second effect evaporator 24. A third effect condensate storage 28 is in operational communication with the third effect heat exchanger 26. A third effect evaporator 30 is in operational communication with the third effect heat exchanger 26. The thermal energy waste recover apparatus 12 is located between the third effect evaporator 30 and the barometric surface condenser 13 to harvest thermal energy before being released. In traditional sodium carbonate manufacturing the third effect evaporator 30 is in direct operational communication with the barometric surface condenser 13.

The thermal energy waste recovery apparatus 12 comprises an ammonia heat exchanger 34 in operational communication with the third effect evaporator 30. An ammonia turbine 36 is coupled to the ammonia heat exchanger 34 and is in operational communication with the ammonia heat exchanger 34. An electric generator 38 is coupled to the ammonia turbine 36 and is in operational communication with the ammonia turbine 36 to produce electricity configured to be stored and returned to the power grid. An ammonia compressor 40 is coupled to the ammonia turbine 36 and is in operational communication with the ammonia turbine 36 and the ammonia heat exchanger 34. The barometric surface condenser 13 is in operational communication with the ammonia heat exchanger 34.

In use, the sodium carbonate production system 10 allows for a method of recapturing thermal energy lost during sodium carbonate manufacturing 50. A step 52 comprises having a sodium carbonate production system 10 comprising the triple effect evaporator apparatus 11, the thermal energy waste recovery apparatus 12, and the barometric surface condenser 13. A step 54 comprises passing ammonia vapor from the third effect evaporator 30 to the ammonia heat exchanger 34. A step 56 comprises pressurizing the ammonia vapor in the ammonia heat exchanger 34. The ammonia vapor may be pressurized to at least 350 psi. A step 58 provides for driving the ammonia turbine 36 with the pressurized ammonia vapor to power the electric generator 38. A step 60 comprises capturing energy produced by the electric generator 38. A step 62 comprises sending the ammonia vapor exiting the ammonia turbine 36 to the ammonia compressor 40. A step 64 comprises pressurizing the ammonia vapor within the ammonia compressor 40. A step 66 provides for sending the ammonia vapor back to the ammonia heat exchanger 34. A step 68 comprises releasing the ammonia vapor to the barometric surface condenser 13.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A sodium carbonate production system comprising:
a triple effect evaporator apparatus comprising:
    a first effect heat exchanger;
    a first effect condensate storage coupled to the first effect heat exchanger, the first effect condensate storage being in operational communication with the first effect heat exchanger;
    a first effect evaporator coupled to the first effect heat exchanger, the first effect evaporator being in operational communication with the first effect heat exchanger;
    a second effect heat exchanger coupled to the first effect evaporator, the second effect heat exchanger being in operational communication with the first effect evaporator;
    a second effect condensate storage coupled to the second effect heat exchanger, the second effect condensate storage being in operational communication with the second effect heat exchanger;
    a second effect evaporator coupled to the second effect heat exchanger, the second effect evaporator being in operational communication with the second effect heat exchanger;
    a third effect heat exchanger coupled to the second effect evaporator, the third effect heat exchanger being in operational communication with the second effect evaporator;
    a third effect condensate storage coupled to the third effect heat exchanger, the third effect condensate storage being in operational communication with the third effect heat exchanger;
    a third effect evaporator coupled to the third effect heat exchanger, the third effect evaporator being in operational communication with the third effect heat exchanger;
a thermal energy waste recovery apparatus comprising:
    an ammonia heat exchanger, the ammonia heat exchanger being in operational communication with the third effect evaporator;
    an ammonia turbine coupled to the ammonia heat exchanger, the ammonia turbine being in operational communication with the ammonia heat exchanger;
    an electric generator coupled to the ammonia turbine, the electric generator being in operational communication with the ammonia turbine to produce electricity; and
    an ammonia compressor coupled to the ammonia turbine, the ammonia compressor being in operational communication with the ammonia turbine and the ammonia heat exchanger; and
a barometric surface condenser, the barometric surface condenser being in operational communication with the ammonia heat exchanger.

2. A thermal energy waste recovery apparatus comprising:
an ammonia heat exchanger, the ammonia heat exchanger being configured to be in operational communication with a third effect evaporator and a barometric surface condenser of a sodium carbonate production system;
an ammonia turbine coupled to the ammonia heat exchanger, the ammonia turbine being in operational communication with the ammonia heat exchanger;

an electric generator coupled to the ammonia turbine, the electric generator being in operational communication with the ammonia turbine to produce electricity; and an ammonia compressor coupled to the ammonia turbine, the ammonia compressor being in operational communication with the ammonia turbine and the ammonia heat exchanger.

3. A method for recapturing thermal energy lost during sodium carbonate manufacturing comprising:

having a sodium carbonate production system comprising:

a triple effect evaporator apparatus comprising:
  a first effect heat exchanger;
  a first effect condensate storage coupled to the first effect heat exchanger, the first effect condensate storage being in operational communication with the first effect heat exchanger;
  a first effect evaporator coupled to the first effect heat exchanger, the first effect evaporator being in operational communication with the first effect heat exchanger;
  a second effect heat exchanger coupled to the first effect evaporator, the second effect heat exchanger being in operational communication with the first effect evaporator;
  a second effect condensate storage coupled to the second effect heat exchanger, the second effect condensate storage being in operational communication with the second effect heat exchanger;
  a second effect evaporator coupled to the second effect heat exchanger, the second effect evaporator being in operational communication with the second effect heat exchanger;
  a third effect heat exchanger coupled to the second effect evaporator, the third effect heat exchanger being in operational communication with the second effect evaporator;
  a third effect condensate storage coupled to the third effect heat exchanger, the third effect condensate storage being in operational communication with the third effect heat exchanger;
  a third effect evaporator coupled to the third effect heat exchanger, the third effect evaporator being in operational communication with the third effect heat exchanger;

a thermal energy waste recovery apparatus comprising:
  an ammonia heat exchanger, the ammonia heat exchanger being in operational communication with the third effect evaporator;
  an ammonia turbine coupled to the ammonia heat exchanger, the ammonia turbine being in operational communication with the ammonia heat exchanger;
  an electric generator coupled to the ammonia turbine, the electric generator being in operational communication with the ammonia turbine to produce electricity; and
  an ammonia compressor coupled to the ammonia turbine, the ammonia compressor being in operational communication with the ammonia turbine and the ammonia heat exchanger; and
  a barometric surface condenser, the barometric surface condenser being in operational communication with the ammonia heat exchanger;

passing ammonia vapor from the third effect evaporator to the ammonia heat exchanger;

pressurizing the ammonia vapor in the ammonia heat exchanger;

driving the ammonia turbine with the pressurized ammonia vapor to power the electric generator;

capturing energy produced by the electric generator;

sending the ammonia vapor exiting the ammonia turbine to the ammonia compressor;

pressurizing the ammonia vapor within the ammonia compressor;

sending the ammonia vapor back to the ammonia heat exchanger; and releasing the ammonia vapor to the barometric surface condenser.

* * * * *